(12) United States Patent
Ignatiev et al.

(10) Patent No.: US 8,427,000 B2
(45) Date of Patent: Apr. 23, 2013

(54) DUAL-MODE ROADWAY TURBINES FOR ENERGY GENERATION FROM ARTIFICIAL PULSED VEHICLE WIND AND CONTINUOUS AMBIENT WIND

(76) Inventors: Alex Ignatiev, Houston, TX (US); Yang Song, Houston, TX (US)

( * ) Notice: Subject to any disclaimer, the term of this patent is extended or adjusted under 35 U.S.C. 154(b) by 278 days.

(21) Appl. No.: 12/820,257

(22) Filed: Jun. 22, 2010

(65) Prior Publication Data
US 2011/0006540 A1    Jan. 13, 2011

Related U.S. Application Data

(60) Provisional application No. 61/219,949, filed on Jun. 24, 2009.

(51) Int. Cl.
*F03D 9/00* (2006.01)
*H02P 9/04* (2006.01)

(52) U.S. Cl.
USPC .......................................... 290/55

(58) Field of Classification Search ............... 290/55, 290/44
See application file for complete search history.

(56) References Cited

U.S. PATENT DOCUMENTS

| | | | | |
|---|---|---|---|---|
| 5,272,378 A | * | 12/1993 | Wither | 290/1 R |
| 2006/0152012 A1 | * | 7/2006 | Wiegel et al. | 290/55 |
| 2007/0059097 A1 | * | 3/2007 | Chen | 404/71 |
| 2007/0264116 A1 | * | 11/2007 | Dempster | 415/4.2 |
| 2008/0150289 A1 | * | 6/2008 | Fein et al. | 290/55 |
| 2009/0224554 A1 | * | 9/2009 | Flynn | 290/55 |
| 2010/0090463 A1 | * | 4/2010 | Nies et al. | 290/44 |

* cited by examiner

*Primary Examiner* — Javaid Nasri
(74) *Attorney, Agent, or Firm* — Robert W Strozier

(57) ABSTRACT

Systems and methods are disclosed for capturing and converting artificial wind, artificial wind and naturally occurring wind and/or artificial wind, naturally occurring wind and solar energy into electrical energy, where the artificial wind is pulsed artificial wind energy generated by passing vehicles. Systems and methods are also disclosed including a plurality of generation apparatuses positioned along a roadway forming a generation grid that may be separate or integrated into other electrical grids.

25 Claims, 11 Drawing Sheets

DUAL-MODE ROADWAY TURBINES FOR ENERGY GENERATION FROM ARTIFICIAL PULSED VEHICLE WIND AND CONTINUOUS AMBIENT WIND

RELATED APPLICATIONS

This application claims priority to and the benefit of U.S. Provisional Patent Application Ser. No. 61/219,949, filed 24 Jun. 2009 (Jun. 24, 2009).

BACKGROUND OF THE INVENTION

1. Field of the Invention

Embodiments of the present invention relate to road-side electrical generator apparatuses and methods for making and using same.

Embodiments of the present invention relate to road-side electrical generator apparatuses and methods for making and using same, where the apparatuses include a base unit, a vertical unit, an artificial (vehicular) wind, electrical generation (AWEG) unit, an optional high efficient illumination unit, an optional nature wind, electrical generation (NWEG) unit, optional sensors, and an optional photovoltaic unit.

2. Description of the Related Art

The US highway infrastructure presents an open canvas for utilization that is complementary to the main traffic flow function of the system. Of specific interest is use of the highway right-of-way for energy generation. Within this scenario, the highway system does not only present a land area associated with right-of-way that can be utilized for energy development, but it also posses a unique untapped energy resource—pulsed artificial wind energy from passing vehicles, especially high profile vehicles such as trucks. Further, many parts of the highway right-of-way also enjoy continuous ambient natural wind with that wind component being quite significant (greater than Class 2 on the Department of Energy Wind Scale).

A number of approaches for using vehicle-generated wind by wind turbines have been described previously.

U.S. Pat. No. 5,272,378 describes a series of vertical turbines mounted in a road barrier and coupled together with a gear drive to turn a generator.

US Published Application No. 2007/0059097 also describes a vertical turbine mounted inside of a highway barrier with protective screens, the barrier to be placed between two opposite lanes of traffic.

US Published Application No. 2007/0264116 additionally describes a series of unprotected vertical wind turbines mounted on top of a roadway barrier, which is also located between two opposite lanes of traffic.

US Published Application No. 2006/0152012 further describes Savonius or helical turbines mounted inside of highway underpasses in either a vertical axis or horizontal axis configuration. The patent application also extends this concept to rail underpasses and tunnels.

An article by S. Abuelsamid in autobloggreen.com (May 1, 2007) describes a student proposal at Arizona State University that incorporates a Darius-type wind turbine mounted horizontally above traffic on support poles.

Another article by R. Cavanaugh in metropolismag.com (Jan. 10, 2007) describes a student project by M. Oberholzer on road barrier mounted vertical Darius-type turbines placed inside the barrier with protective screening on the outside.

None of the above references refer to the complementary utilization of the ambient natural wind together with pulsed artificial vehicle wind. Further, none of the references have quantified the artificial wind characteristics of a passing vehicle, and have not identified the needed advancements in wind turbine design to take maximum advantage of both pulsed (artificial) and ambient wind. Thus, there is a need in the art for a system, apparatus and method designed to utilize vehicle generated wind and vehicle generated wind and ambient wind.

SUMMARY OF THE INVENTION

Embodiments of the present invention provide road-side apparatuses including a base unit and a vertical unit. The base unit includes a body, a generator, an optional electrical storage unit and optionally a conduit for connecting the apparatus to a grid. The vertical unit includes a vertical artificial wind turbine or a plurality of vertical artificial wind turbines, where the vertical turbines are disposed on a lower section of the vertical unit to maximize artificial wind utilization. The vertical unit may optionally include a vertical or horizontal naturally occurring wind turbine or a plurality of such turbines disposed in an upper section of the vertical unit. The vertical unit may also optionally include a wireless communication assembly, an environmental sensor assembly and/or a roadway sensor assembly. The vertical unit may also optionally include a roadway illumination assembly and/or optionally a photovoltaic assembly. The apparatuses are adapted to be positioned on either or both sides of a roadways so that the artificial wind turbines are located a distance d from the immediately adjacent lane to maximize artificial wind utilization, where d is a distance where the artificial wind speed is at least 2 m/s. In other embodiments, the d is selected so that the artificial wind speed is at least 3 m/s. In other embodiments, the d is selected so that the artificial wind speed is at least 4 m/s. Alternatively, the generators may be an integral part of the turbine, so that the generators are located in the vertical unit instead of the base unit.

Embodiments of the present invention provide road-side illumination apparatuses including a high efficient illumination unit, a nature wind, electrical generation (NWEG) unit, an artificial (vehicular) wind, electrical generation (AWEG) unit, a base unit, a vertical unit, optional sensors, and an optional photovoltaic unit. The apparatuses are adapted to be positioned within a distance d of the right most lane and/or left most lane of a thorough fare. The apparatuses are adapted to utilize pulsed vehicular (artificial) wind, continuous natural (ambient) wind (dual-mode wind) and optionally solar energy from solar panels to provide electrical power to the illumination unit and the sensors. The apparatuses may be standalone, but may also be integrated with an electric grid so that excess electrical power may be pushed into the grid and auxiliary electric power pulled from the grid. In certain embodiments, the NWEG and AWEG units comprise small vertical axis wind turbines to allow for stable and efficient operation.

Embodiments of the present invention provide road-side illumination apparatuses including a high efficient illumination unit, a nature wind, electrical generation (NWEG) unit, an artificial (vehicular) wind, electrical generation (AWEG) unit, a base unit, a vertical unit, optional sensors, and an optional photovoltaic unit. The apparatuses are adapted to be positioned within a distance d of the right most lane and/or left most lane of a thorough fare. The apparatuses are adapted to utilize pulsed vehicular (artificial) wind, continuous natural (ambient) wind (dual-mode wind) and optionally solar energy from solar panels to provide electrical power to the illumination unit and the sensors. The apparatuses may be standalone, but may also be integrated with an electric grid so that excess electrical power may be pushed into the grid and auxiliary electric power pulled from the grid. In certain embodiments, the NWEG and AWEG units comprise small vertical axis wind turbines to allow for stable and efficient operation.

Embodiments of the present invention provide systems and methods for generating electrical energy from artificially generated or vehicle wind, artificial and naturally occurring wind and artificial wind, naturally occurring wind and solar energy, where the systems includes a plurality of apparatuses of this invention distributed in a spaced apart configuration along a length of a roadway to supply electric power to illuminate the roadway, to collect information concerning the roadway, roadway use, roadway conditions, etc. The apparatuses may also be linked together via overhead, surface or underground wiring to form an electrical grid or the apparatuses may be linked into an existing local or national grid. The systems and methods may include a single type of apparatus of this invention or a plurality of types of apparatuses of this invention. Thus, the systems may include all tri-mode apparatuses, all dual-mode apparatuses, all single-mode apparatuses or a mixture of tri-mode, dual-mode and single-mode apparatus. Additionally, the type of apparatus selected for each location may be tailored for the environment of the site. Thus, if the site have light naturally occurring wind, that site may include a single-mode apparatus (artificial wind only) or a dual-mode apparatus (artificial wind and solar panel). If the site see light sunlight, then the site may include a single-mode apparatus (artificial wind only) or a dual-mode apparatus (artificial and naturally occurring wind).

Embodiments of the present invention provide methods for generating electric energy from road-side apparatuses of this invention. The method includes locating an apparatus of this invention on either side or both sides of a roadway so that the apparatus are positioned a distance d from the immediately adjacent lane, where d is a distance where the artificial wind speed is at least 2 m/s. In other embodiments, the d is selected so that the artificial wind speed is at least 3 m/s. In other embodiments, the d is selected so that the artificial wind speed is at least 4 m/s.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1:
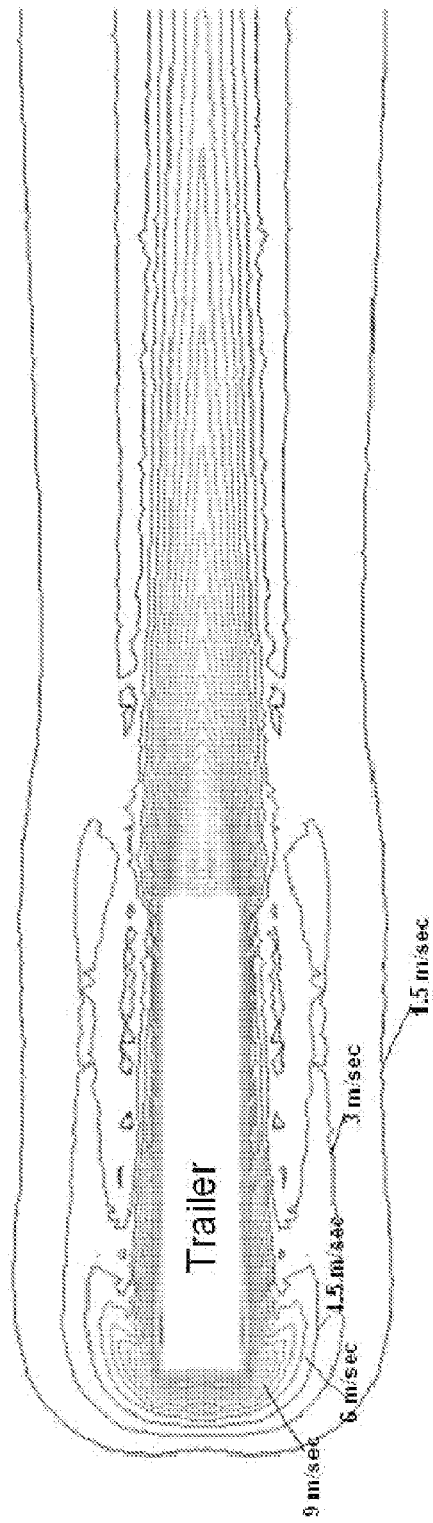
FIG. 1 depicts a bow wave CFD calculations for a truck trailer of dimension 2.6 m wide×16 m long×3 m maximum height above the ground traveling at 27 m/s.

The inventors have found that road-side electrical generation apparatuses can be constructed for converting a portion of energy associated with pulsed artificial wind generated by vehicles traveling on the road system of the United States into electrical energy or power. The apparatuses can also be constructed to convert a portion of energy associated with ambient or nature occurring wind into electrical energy or power. The apparatuses can also be constructed to convert sun light via photovoltaic panels into electrical energy or power. The inventors have found that vertical axis single-mode wind turbine systems, dual-mode wind turbine systems, or tri-mode wind turbine systems (including photovoltaic panels as a third mode of electrical energy generation) can be safely placed along a roadway for the generation of electrical energy or power. The dual-mode and the tri-mode systems are designed to utilize BOTH the artificial pulsed wind created by passing vehicles AND the naturally occurring ambient wind that is present in many highway environments. The dual-mode and tri-mode systems are designed such that they can effectively and efficiently utilize the artificial pulsed wind and the natural continuous wind through one or a plurality of vertical axis wind turbines connected to one or more electricity generators. The turbines utilized for naturally occurring wind may be horizontal axis wind turbines as well depending on design choice. The systems may be erected on either side of a roadway, or in the central median, and may be stand alone structures with footing support, or may be part of traffic barriers. The systems may include integrated roadway lighting (mercury, sodium or LED), have integrated sensors for measuring both the health of the system and its output as well as the health of the highway, and have monitoring and communications components powered by the wind-generated energy or the wind-generated and solar generated energy to move the highway into the Intelligent Transportation System (ITS) scenario.

As noted, the need to harness both the artificial pulsed wind and the continuous ambient wind will require a turbine design and placement that can accomplish both needs. Such a design has not been previously reported. Additional to the consideration of fully utilizing both the artificial vehicle generated wind, and the naturally occurring ambient wind is the overall safety design of the dual-mode turbine as it pertains to installation along a roadway. The American Association of State Highway and Transportation Officials' publication entitled "A Policy on Geometric Design of Highways and Streets and Roadside Design Guide" is an excellent document for use in defining the installation requirements for roadway structures as they pertain to lateral clearance to travel lanes, impacts on sight distance, and vertical clearance to highway structures.

This dual-mode roadway wind turbine system through its electrical energy generation can support the energy needs of the highway system, and with additional generated energy can support the renewable energy interests of the nation. For the highway system, the dual-mode turbine wind energy can be available for uses such as for roadway lighting, for 'smart highway' development requiring monitoring, sensing, communicating and controlling functions including wireless traffic cameras powered by the new highway electrical grid, and for the support (illumination, heating, cooling) of highway department buildings. Excess energy, as projected from large installations (many hundreds of dual-mode wind turbines) can be fed into the national or local electrical energy grids resulting in an additional renewable energy supply for the nation.

Past references have not clearly delineated the benefits of the availability of the dual-mode wind electrical energy to the highway system, nor have they clearly described how the generated wind energy would be utilized in the national or local electrical energy grids. The direct possibility of generating several tens of Mega Watts of electrical power per mile of highway by this technology opens up the distinct possibility of energy generation in excess of highway maintenance needs, and resultant feed of electrical energy into the national electrical grid at a rate of hundreds or even thousands of MW of power, thus creating a new utilization of highway right-of-ways for alternative energy generation. What is needed is a robust, high output vertical turbine system that can take advantage of both the pulsed artificial highway wind, and the continuous ambient natural wind such as out dual-mode highway turbine system.

Turbine design and modification to support both the pulsed artificial wind and continuous ambient wind is done so within a cost conscious environment. Pulsed wind is especially problematic for turbine operation no matter what type of turbine is used. However, vertical axis turbines and their axial structural strength best respond to the dual-mode wind operation need. The Savonius-type vertical axis turbine has an ability to rapidly respond to changing wind speed and will accommodate the highway pulsed artificial wind, whereas the Darius-type vertical axis turbine with its high efficiency and stable response to continuous wind will respond to the ambient wind conversion need. It is further acceptable to use horizontal axis turbines for the ambient wind where such turbines are mounted on a gimbal allowing for the horizontal turbine to continually face the naturally occurring wind. The dual-mode roadway wind turbine system will therefore accommodate both the pulse artificial vehicular wind and the naturally occurring continuous ambient wind, and utilize the highway right-of-way of our roadway systems for generation of electrical energy from its unique artificial and ambient wind resource.

Suitable vertical wind turbines include, without limitation, Darrieus type vertical wind turbines; Savonius type vertical wind turbines; Giromill type vertical wind turbines; helical blade type vertical wind turbines, cycloturbine type vertical wind turbines, other type vertical wind turbines or mixtures and combinations thereof.

EXPERIMENTS OF THE INVENTION

Bow wave air disturbance created by a moving vehicle, especially of high profile vehicles such as truck, buses or similar high profile vehicles can be utilized to generate wind energy—electrical energy derived from wind, but needs to be fully quantified and measured. To this end, we have undertaken computational fluid dynamics (CFD) calculations to visualize the vehicular bow wave, and to determine the possibility of harnessing that artificial wind for power generation. It is well know that the air flow around a truck and in its wake is highly turbulent. Therefore, a turbulence model was needed for the calculations. In general, the most common Reynolds-Averaged Navier-Stokes (RANS) turbulence model is desirable to solve simple, zero pressure gradient attached flows. Since the flow over the major part of a truck trailer is attached, it was well suited to RANS approach. The STAR-CCM+ computation program was used to conduct the CFD analysis. The simplified truck trailer body was represented by a partially blunt rectangular body with length L=16 meter, width W=2.6 meter, and height H=3 meter. Truck trailer underbody components were removed from the analysis. The inflow boundary employs constant velocity $u_x$, (27 m/s) and constant temperature (300 K), and enforces inflow normal to the boundary. The outflow boundary used a fixed static pressure of 0 $N/m^2$. A no-slip condition on velocity was employed on the ground and the truck trailer body surface, while the top and side walls of the wind tunnel employed slip velocity conditions.

Referring now to FIG. 1, the data from the CFD calculations are shown as a horizontal-plane air velocity distribution with respect to a zero air velocity at the undisturbed ground generated by a truck trailer traveling at ~60 mi/hr (27 m/s). FIG. 1 clearly shows the bow wave structure around the leading edge of the truck trailer, and indicates that the bow wave velocity can reach up to 4 m/sec at a horizontal distance of about 3 meters from the vehicle. This vehicle-generated wind speed is adequate at the 3 meter distance to operate a vertical axis wind turbines such as Savonius-type wind turbines, and at closer distances is even more effective in generating energy from a vertical axis wind turbine.

DETAILED DESCRIPTION OF THE DRAWINGS

While the roadway electrical generator apparatuses of this invention are illustrated and described in a various embodiments, the systems may be realized in many different configurations, forms and materials. Depicted in the drawing and herein described are specific embodiments of the invention, with the understanding that the present disclosure is to be considered and exemplification of the principles of the invention, and is not intended to limit the invention to only the embodiments illustrated. Those skilled in the art will envision many other possible variations within the scope of the present invention.

Single-Mode and Dual-Mode Embodiments

Figure 2A:
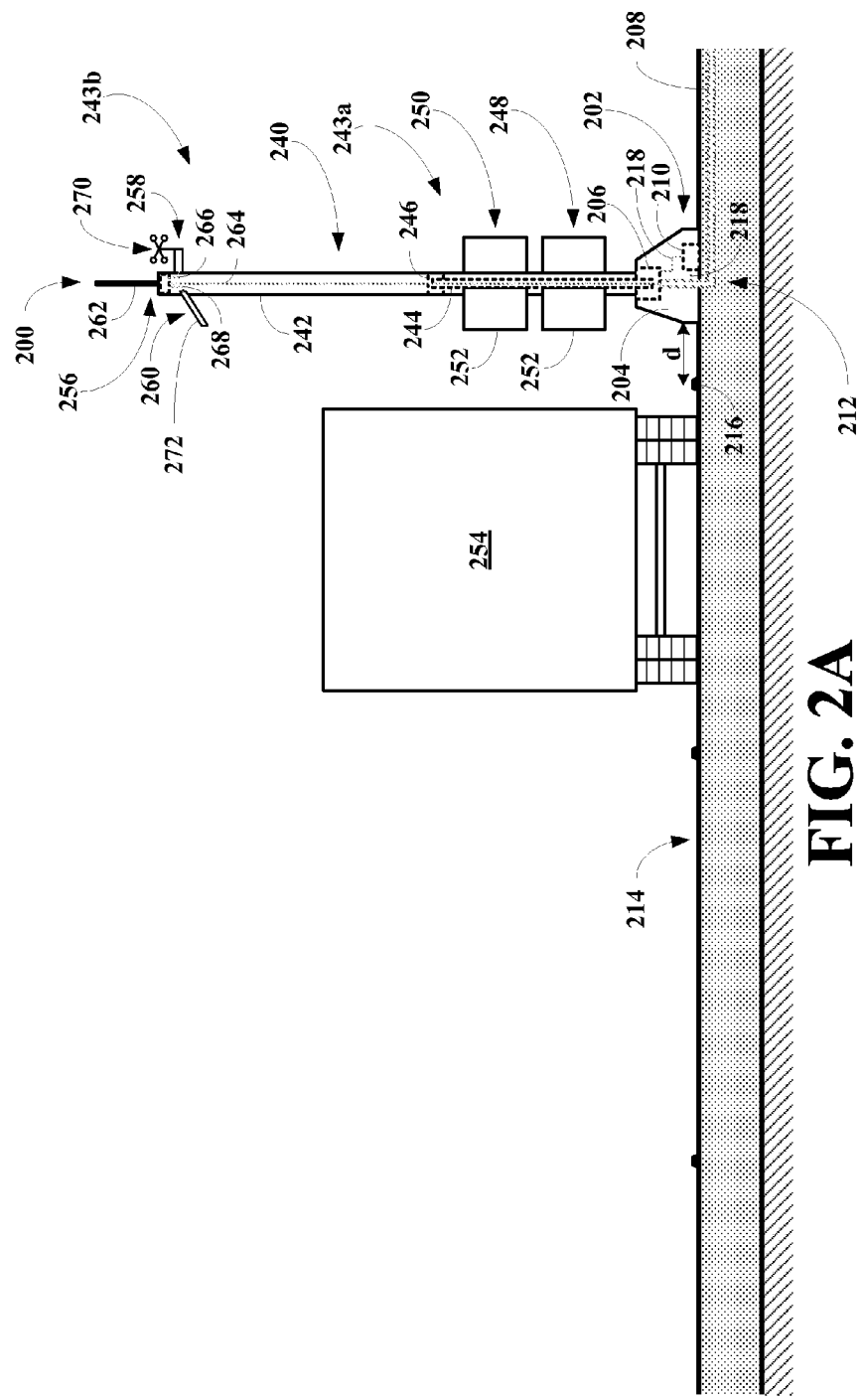
FIG. 2A depicts an embodiment of this invention of an electrical energy generating apparatus utilizing artificial wind.

Referring now to FIG. 2A, an embodiment of an apparatus of this invention, generally 200, is shown to include a base unit 202 and a vertical unit 240, where this embodiment is adapted to utilize artificial pulsed vehicle generated wind from vehicles traveling on a roadway in proximity to apparatus to generated electrical power. The base unit 202 includes a body 204, a generator 206, optionally an electrical conduit 208 and optionally an electrical storage unit 210. The base unit 202 is located at a position 212 along a road way 214 a distance d from a right hand lane marker 216. The electrical storage unit 210 is connected to the generator and to the electrical conduit 208 via conducting wires 218.

The vertical unit 240 includes a housing 242 having a lower section 243a and an upper section 243b. Disposed within the housing 242 is a rotatable vertical shaft 244 extending from the generator 206 to a bearing assembly 246. Rotation of the shaft 244 is used by the generator 206 to generate electric power. Mounted on the shaft 244 is a first vertically oriented wind turbine 248 and an optional second vertically oriented wind turbine 250. In certain embodiments, the vertical shaft 244 will mount more than two turbines depending on design requirements and choice. In certain embodiments, wind turbine blades 252 extend into the bow wave pattern of a high profile vehicle 254 to a location within a bow wave region having an artificial wind speed of at least 2 m/s as shown in FIG. 1. The apparatus 200 may also work for other vehicles besides high profile vehicles. In other embodiments, the blades 252 extend into a bow wave region having an artificial wind speed of at least 3 m/s as shown in FIG. 1. In other embodiments, the blades 252 extend into a bow wave region having an artificial wind speed of at least 3.5 m/s as shown in FIG. 1. In other embodiments, the blades 252 extend into a bow wave region having an artificial wind speed of at least 4.0 m/s as shown in FIG. 1. In other embodiments, the blades 252 extend into a bow wave region having an artificial wind speed of at least 4.5 m/s as shown in FIG. 1.

The vertical unit 240 may also include a wireless communication assembly 256. The vertical unit 240 may also include an environmental sensor assembly 258. The vertical unit 240 may also include a roadway sensor assembly 260. The wireless communication assembly 256 includes an antenna 262 for receiving instructions from a remote site and transmitting responses and data to the remote site. The wireless communication assembly 256 is connected to the generator 206 via a first conducting wire 264, where the generator 206 or the storage unit 210 or the conduit 208 provides the electric energy needed by the assemblies 256, 258 and 260. The environmental sensor assembly 258 is connected to the wireless communication assembly 256 via a second conducting wire 266. The roadway sensor assembly 260 is connected to the wireless communication assembly 266 via a third conducting wire 268. The environmental sensor assembly 258 includes a wind speed and direction sensor 270. The environmental sensor assembly 258 may also include temperature sensors, humidity sensors, or other sensors that measure other environmental conditions. The roadway sensor assembly 260 includes a camera 272. The roadway sensor assembly 260 may also include radar sensors, counting sensors, or other sensors that measures other roadway conditions.

The vertical unit 240 is the principal vertical support that supports the rotatable vertical shaft 244 and the vertical oriented wind turbine 248 and 250, which are decoupled from each other on the shaft 244 and are attached separately to the generator 206 disposed in the base unit 202 supporting the vertical unit 240. The vertical axis or oriented wind turbines 248 and 250 may be any vertical axis wind turbine. In certain embodiments, a single turbine may be used, while in other embodiments, a plurality of turbines may be utilized to capture both the vehicular wind. The turbines 248 and 250 may be ducted to better accumulate the vehicle generate wind. The vertical shaft 244 is affixed to the base unit 202, which may be attached to the ground and placed near enough to the roadway to allow for the turbine or turbines 248 and 250 to capture the vehicle generated wind. The vertical unit 240 is also tall enough and strong enough to support the assemblies 256, 258 and 260 and to support the rotatable shaft 244 and the turbines 248 and 250.

The conduit 208 transfers the generated electrical energy, beyond that used by the apparatus 200 itself, either to a highway electric grid for use in highway electric energy needs or to a national or local electric grid. Electrical transformers may be required for these purposes. The transforms may be included in the base unit 202. Further, the electrical energy may also be transmitted through power lines strung between a plurality of apparatuses 200 positioned in a space apart configuration along a road side. The power lines would extend from an upper position of the vertical unit 240. Both underground conduit distribution and power line distribution can form the basis for a highway electrical energy grid yielding both energy-rich highways and roadway wind energy feeding the electrical grid.

The embodiment of FIG. 2A represents a single-mode apparatus as it derives electrical energy from only a single source namely artificially generated wind.

Figure 2B:
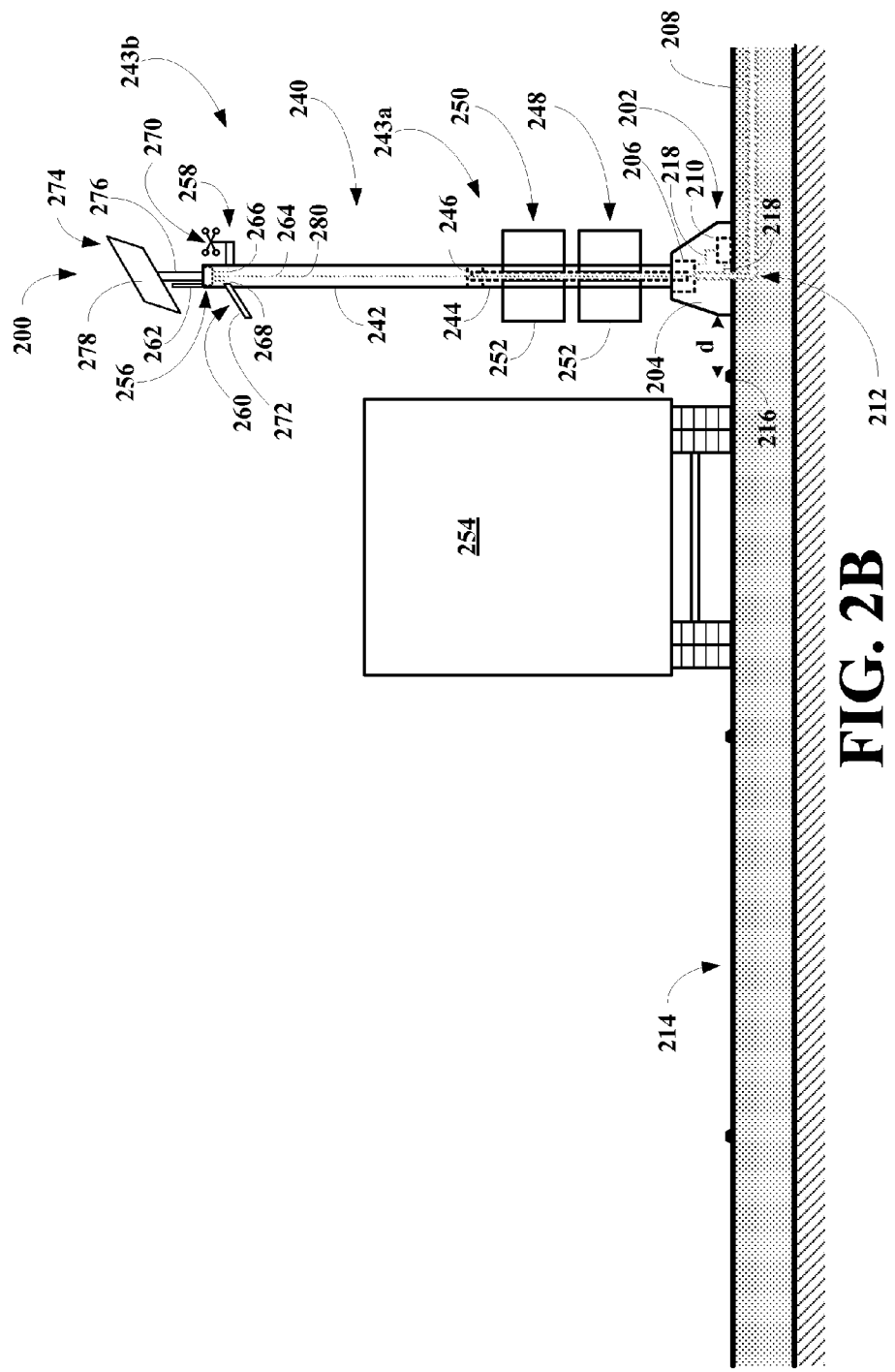
FIG. 2B depicts another embodiment of this invention of an electrical energy generating apparatus utilizing artificial wind with a photovoltaic assembly.

Referring now to FIG. 2B, an embodiment of an apparatus of this invention, generally 200, is shown to further include a photovoltaic assembly 274, which includes a vertical mount 276 and a solar panel 278 connected via a fourth wire 280 to the conduit 208 and/or storage unit 210, where the fourth wire 280 runs coincident with the wire 264.

Figure 2C:
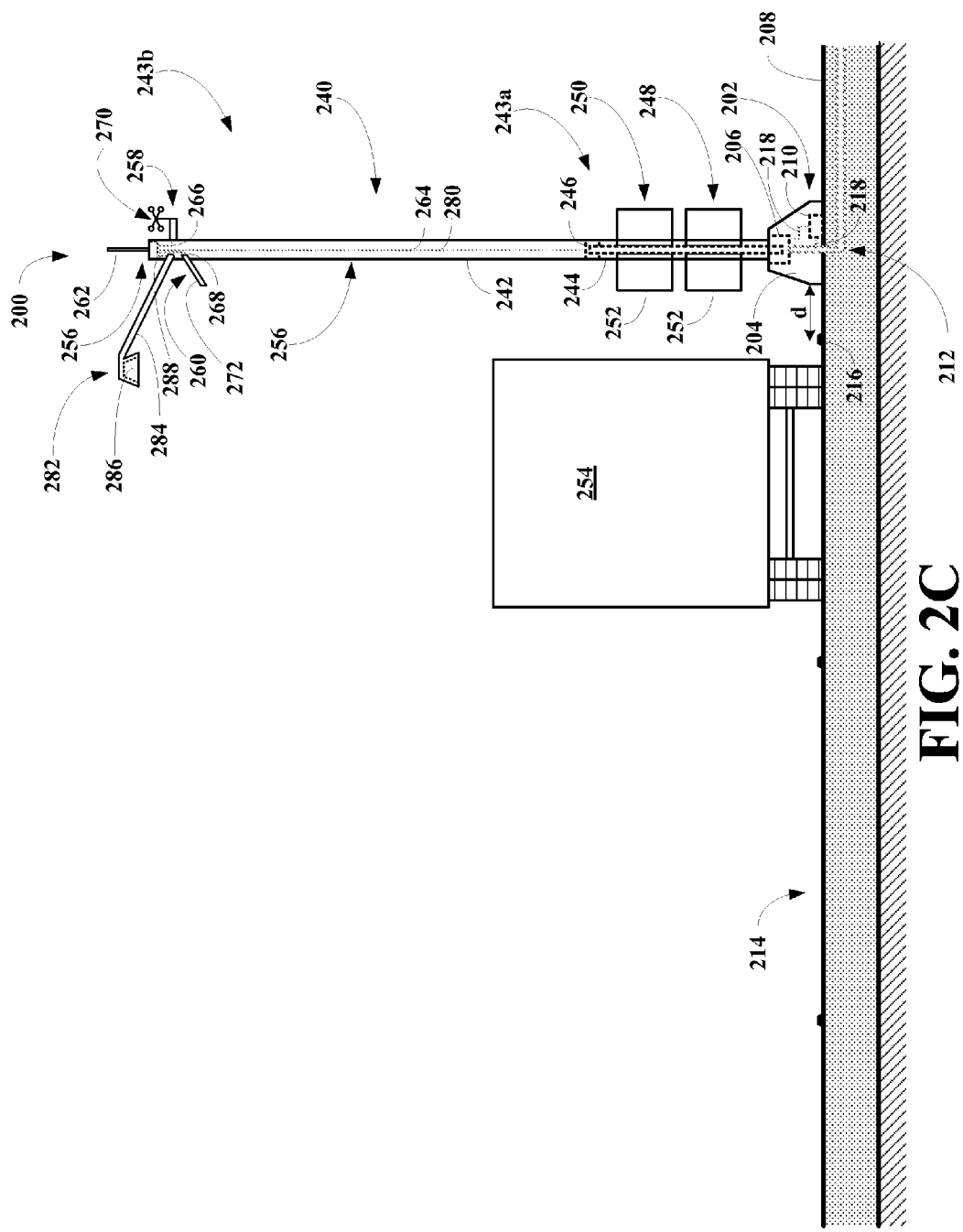
FIG. 2C depicts another embodiment of this invention of an electrical energy generating apparatus utilizing artificial wind with an illumination assembly.

Referring now to FIG. 2C, an embodiment of an apparatus of this invention, generally 200, is shown to further include an illumination assembly 282, which includes an angled mount 284 and a light 286 connected via a fifth wire 288 to the assembly 256.

Figure 2D:
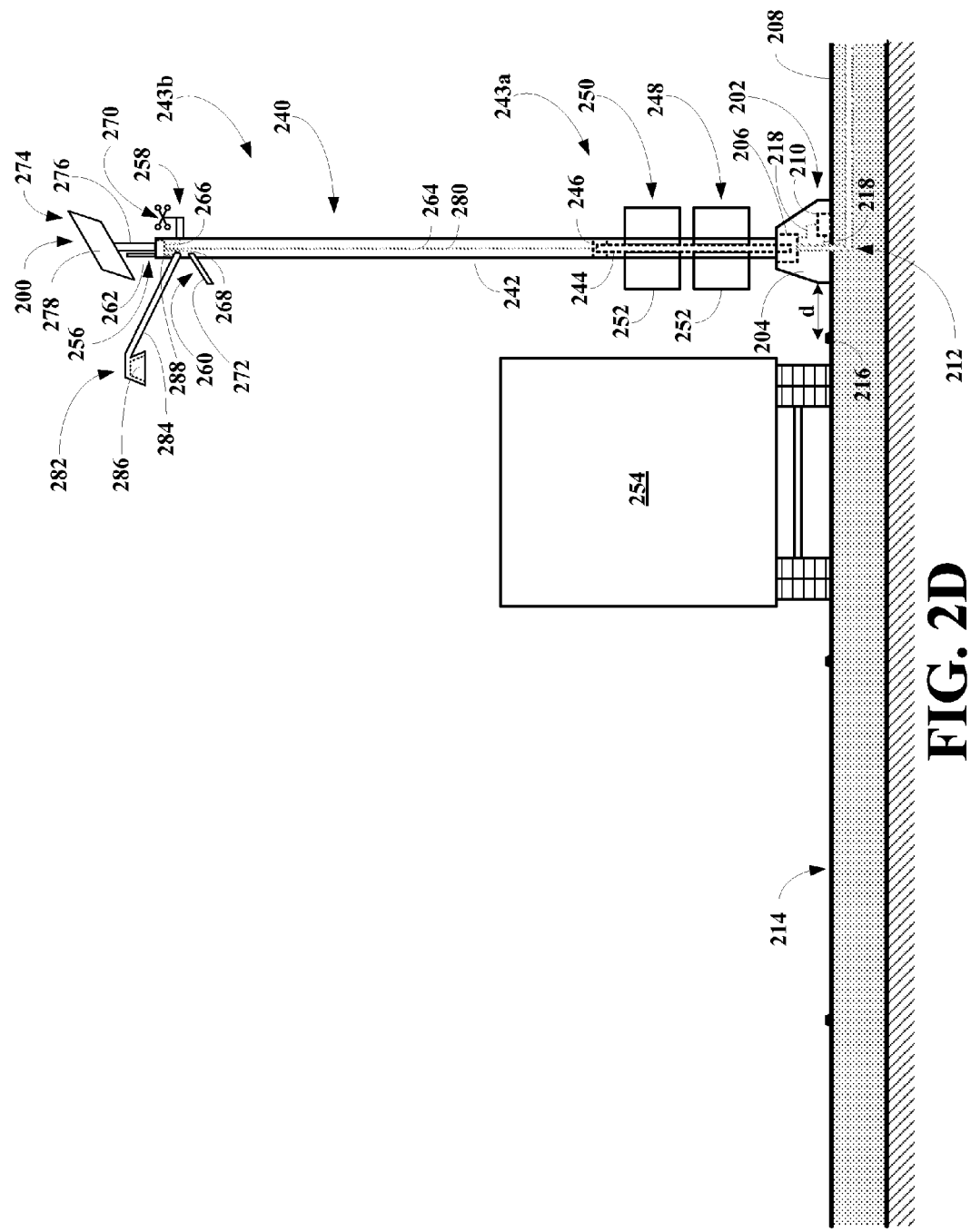
FIG. 2D depicts another embodiment of this invention of an electrical energy generating apparatus utilizing artificial wind with a photovoltaic assembly and an illumination assembly.

Referring now to FIG. 2D, an embodiment of an apparatus of this invention, generally 200, is shown to further include the photovoltaic assembly 274, which includes the vertical mount 276 and the solar panel 278 connected via the fourth wire 280 to the conduit 208 and/or storage unit 210, where the fourth wire 280 runs coincident with the wire 264. The apparatus 200 further includes the illumination assembly 282, which includes the angled mount 284 and the light 286 connected via the fifth wire 288 to the assembly 256.

Dual-Mode and Tri-Mode Embodiments

Referring now to FIGS. 3A-D, embodiments of a dual-mode apparatus of this invention, generally 300, is shown to include a base unit 302 and a vertical unit 340, where this embodiment is adapted to utilize artificial pulsed vehicle generated wind at the roadway in proximity to apparatus and natural wind to generated electrical power. The base unit 302 includes a body 304, an outer generator 306a an inner generator 306b, an optional electrical conduit 308 and optionally an electrical storage unit 310. The base unit 302 is located at a position 312 along a road way 314 a distance d from a right hand lane marker 316. The electrical storage unit 310 is connected to the outer generator 306a, the inner generators 306band to the electrical conduit 308 via conducting wires 318.

The vertical unit 340 includes a housing 342 having a lower section 343a and an upper section 343b. Disposed within the housing 342 is an outer rotatable vertical shaft 344a extending from the outer generator 306a to an outer bearing assembly 346a. Disposed within the housing 342 is an inner rotatable vertical shaft 344b extending from the inner generator 306b to an inner bearing assembly 346b. Rotation of the outer shaft 344a is used by the outer generator 306a to generate electric power, while rotation of the inner shaft 344b is used by the inner generator 306b to generate electric power. Mounted on the outer shaft 344a is a first vertically oriented wind turbine 348 and an optional second vertically oriented wind turbine 350. In certain embodiments, the vertical shaft 344a may be used to mount more than two turbines depending on design requirements and choice. In certain embodiments, the vertical wind turbines may have an electrical generator integral to the vertical axis turbine. In certain embodiments, wind turbine blades 352 extend into the bow wave pattern of a high profile vehicle 354 to a location within a bow wave region having an artificial wind speed of at least 2 m/s as shown in FIG. 1. In other embodiments, the blades 352 extend into a bow wave region having an artificial wind speed of at least 3 m/s as shown in FIG. 1. In other embodiments, the blades 352 extend into a bow wave region having an artificial wind speed of at least 3.5 m/s as shown in FIG. 1. In other embodiments, the blades 352 extend into a bow wave region having an artificial wind speed of at least 4.0 m/s as shown in FIG. 1. In other embodiments, the blades 352 extend into a bow wave region having an artificial wind speed of at least 4.5 m/s as shown in FIG. 1.

Mounted on the inner shaft 344b is a natural wind vertically oriented wind turbine 355 having blades 355a. The natural wind turbine 355 is located near a top 343c of the vertical housing 342. The natural wind turbine 355 may be larger than the artificial wind turbines 348 and 350 because there are less space restrictions compared to the artificial wind turbines 348 and 350. In other embodiments, the turbine adapted for capturing the natural ambient wind 355 can also be a horizontal axis turbine with integral generator. Alternatively, the nature wind turbines 355 may be a horizontally oriented turbine.

The vertical unit 340 may also include a wireless communication assembly 356. The vertical unit 340 may also include an environmental sensor assembly 358. The vertical unit 340 may also include a roadway sensor assembly 360. The wireless communication assembly 356 includes an antenna 362 for receiving instructions from a remote site and transmitting responses and data to the remote site. The wireless communication assembly 356 is connected to the generator 306 via a first conducting wire 364, where the generator 306 or the storage unit 310 or the conduit 308 provides the electric energy needed by the assemblies 356, 358 and 360. The environmental sensor assembly 358 is connected to the wireless communication assembly 356 via a second conducting wire 366. The roadway sensor assembly 360 is connected to the wireless communication assembly 356 via a third conducting wire 368. The environmental sensor assembly 358 includes a wind speed and direction sensor 370. The environmental sensor assembly 358 may also include temperature sensors, humidity sensors, or other sensors that measure other environmental conditions. The roadway sensor assembly 360 includes a camera 372. The roadway sensor assembly 360 may also include radar sensors, counting sensors, or other sensors that measures other roadway conditions.

The vertical unit 340 is the principal vertical support that supports the rotatable vertical shaft 344 and the vertical oriented wind turbine 348 and 350, which are decoupled from each other on the shaft 344 and are attached separately to the generator 306 disposed in the base unit 302 supporting the vertical unit 340. The vertical axis or oriented wind turbines 348 and 350 may be any vertical axis wind turbine. In certain embodiments, a single turbine may be used, while in other embodiments, a plurality of turbines may be utilized to capture both the vehicular wind. The turbines 348 and 350 may be ducted to better accumulate the vehicle generate wind. The vertical shaft 344 is affixed to the base unit 302, which may be attached to the ground and placed near enough to the roadway to allow for the turbine or turbines 348 and 350 to capture the vehicle generated wind. The vertical unit 340 is also tall enough and strong enough to support the assemblies 356, 358 and 360 and to support the rotatable shaft 344 and the turbines 348 and 350.

The conduit 308 transfers the generated electrical energy, beyond that used by the apparatus 300 itself, either to a highway electric grid for use in highway electric energy needs or to a national or local electric grid. Electrical transformers may be required for these purposes. The transforms may be included in the base unit 302. Further, the electrical energy may also be transmitted through power lines strung between a plurality of apparatuses 300 positioned in a space apart configuration along a road side. The power lines would extend from an upper position of the vertical unit 340. Both underground conduit distribution and power line distribution can form the basis for a highway electrical energy grid yielding both energy-rich highways and roadway wind energy feeding the electrical grid.

Figure 3A:
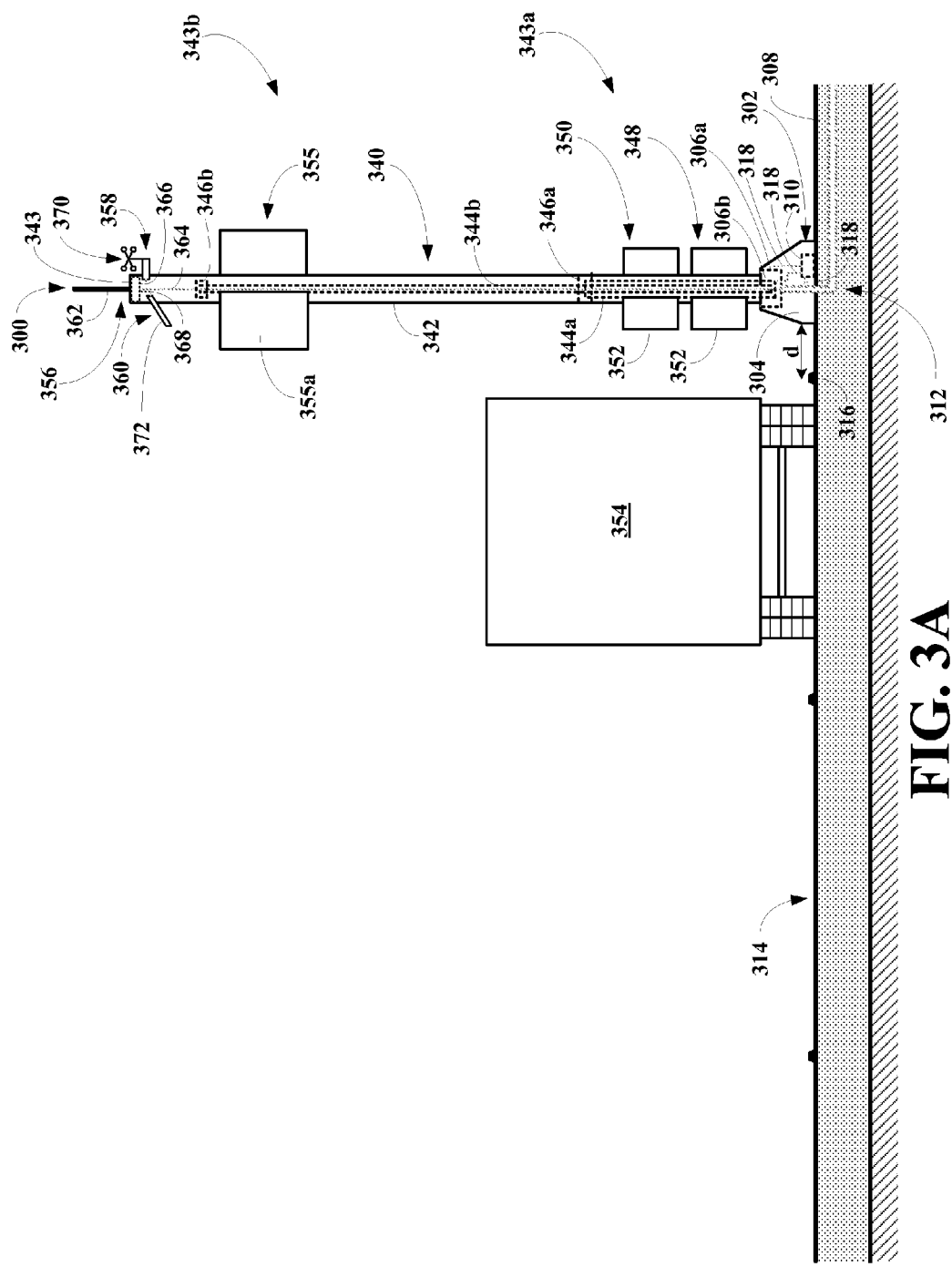
FIG. 3A depicts another embodiment of this invention of an electrical energy generating apparatus utilizing artificial wind and natural occurring wind.

The embodiment of FIG. 3A represents a single-mode apparatus as it derives electrical energy from only a single source namely artificially generated wind.

Figure 3B:
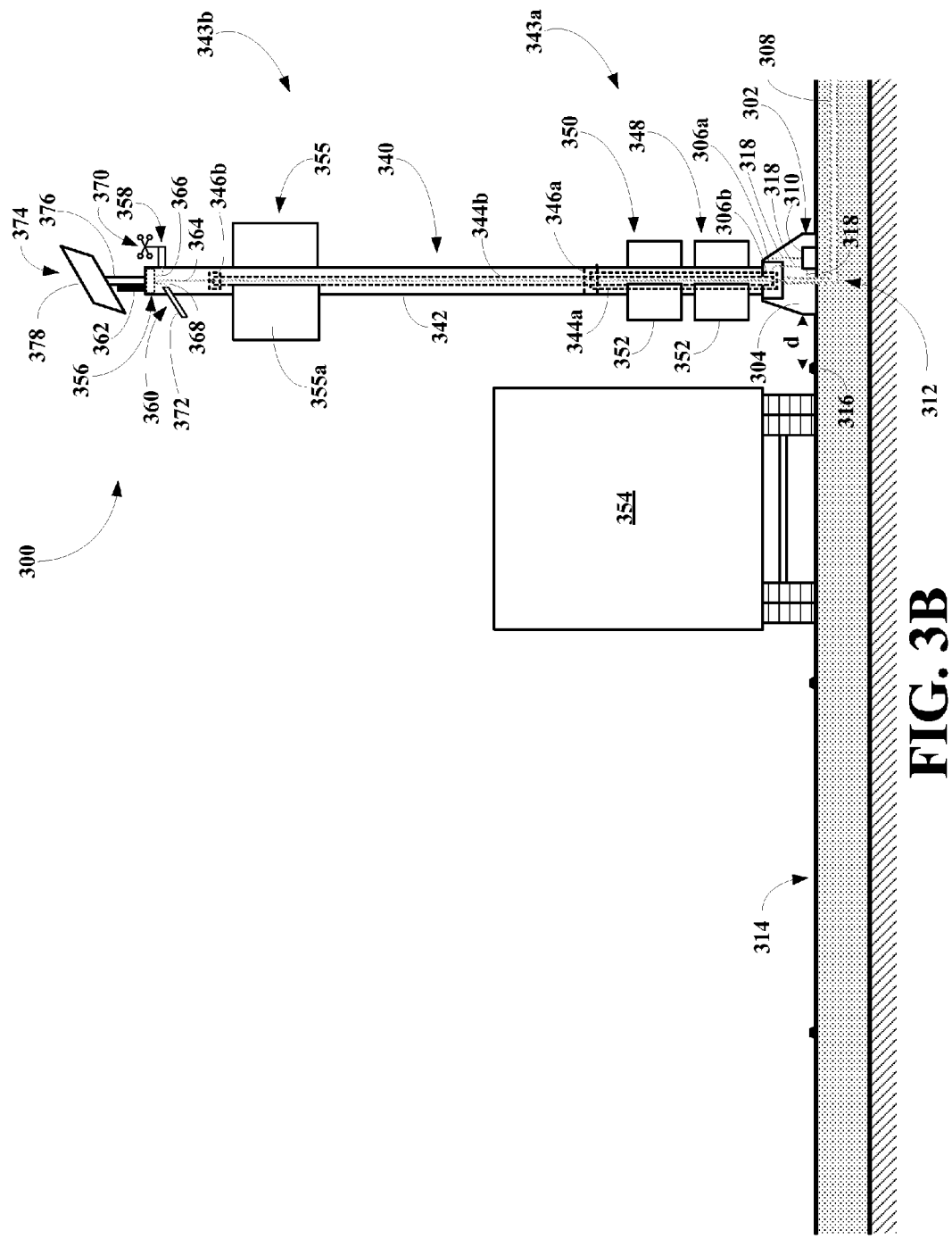
FIG. 3B depicts another embodiment of this invention of an electrical energy generating apparatus utilizing artificial wind and natural occurring wind with a photovoltaic assembly.

Referring now to FIG. 3B, an embodiment of an apparatus of this invention, generally 300, is shown to further include a photovoltaic assembly 374, which includes a vertical mount 376 and a solar panel 378 connected via a fourth wire 380 to the conduit 308 and/or storage unit 310, where the fourth wire 380 runs coincident with the wire 364.

Figure 3C:
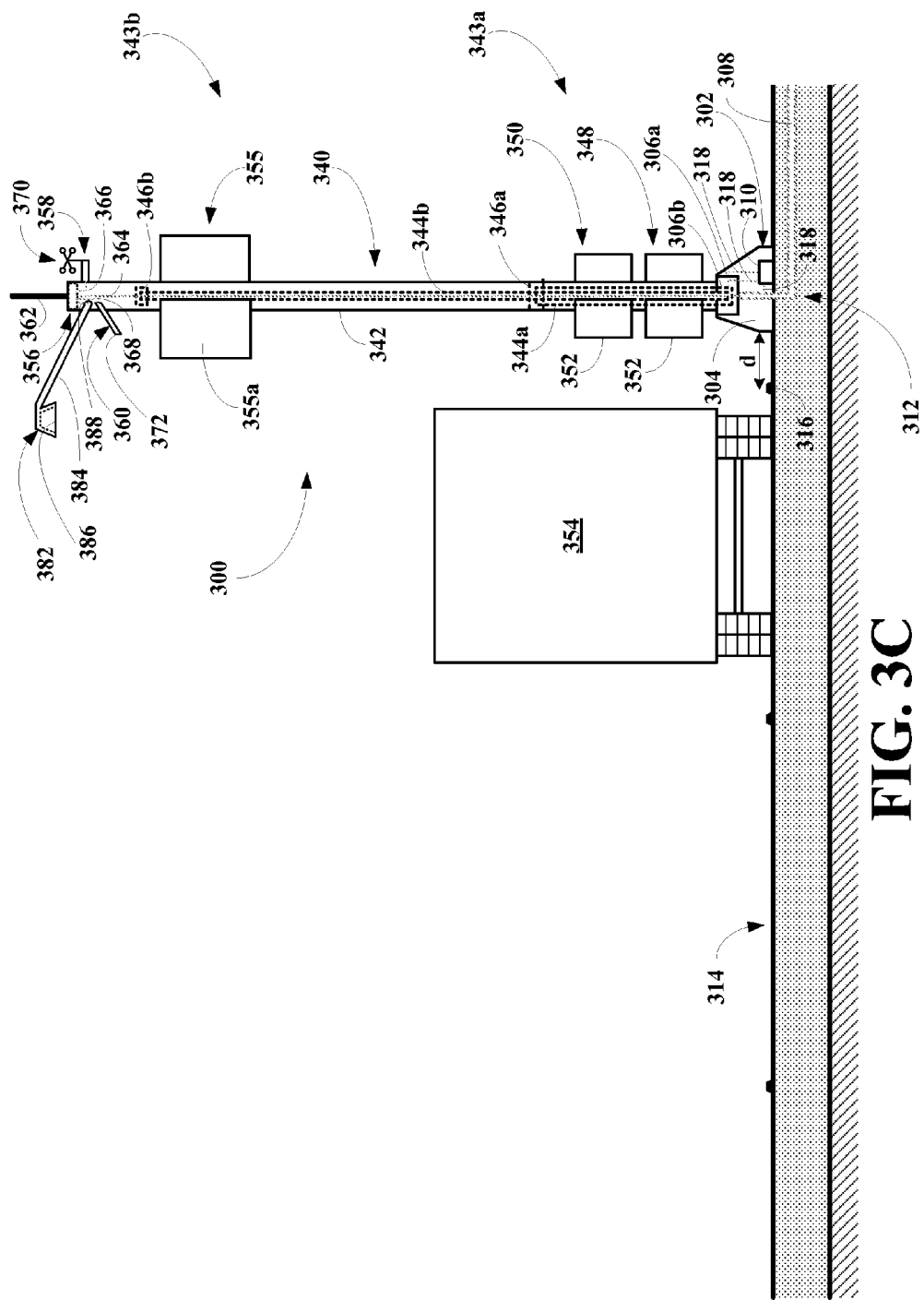
FIG. 3C depicts another embodiment of this invention of an electrical energy generating apparatus utilizing artificial wind and natural occurring wind with an illumination assembly.

Referring now to FIG. 3C, an embodiment of an apparatus of this invention, generally 300, is shown to further include an illumination assembly 382, which includes an angled mount 384 and a light 386 connected via a fifth wire 388 to the assembly 356.

Figure 3D:
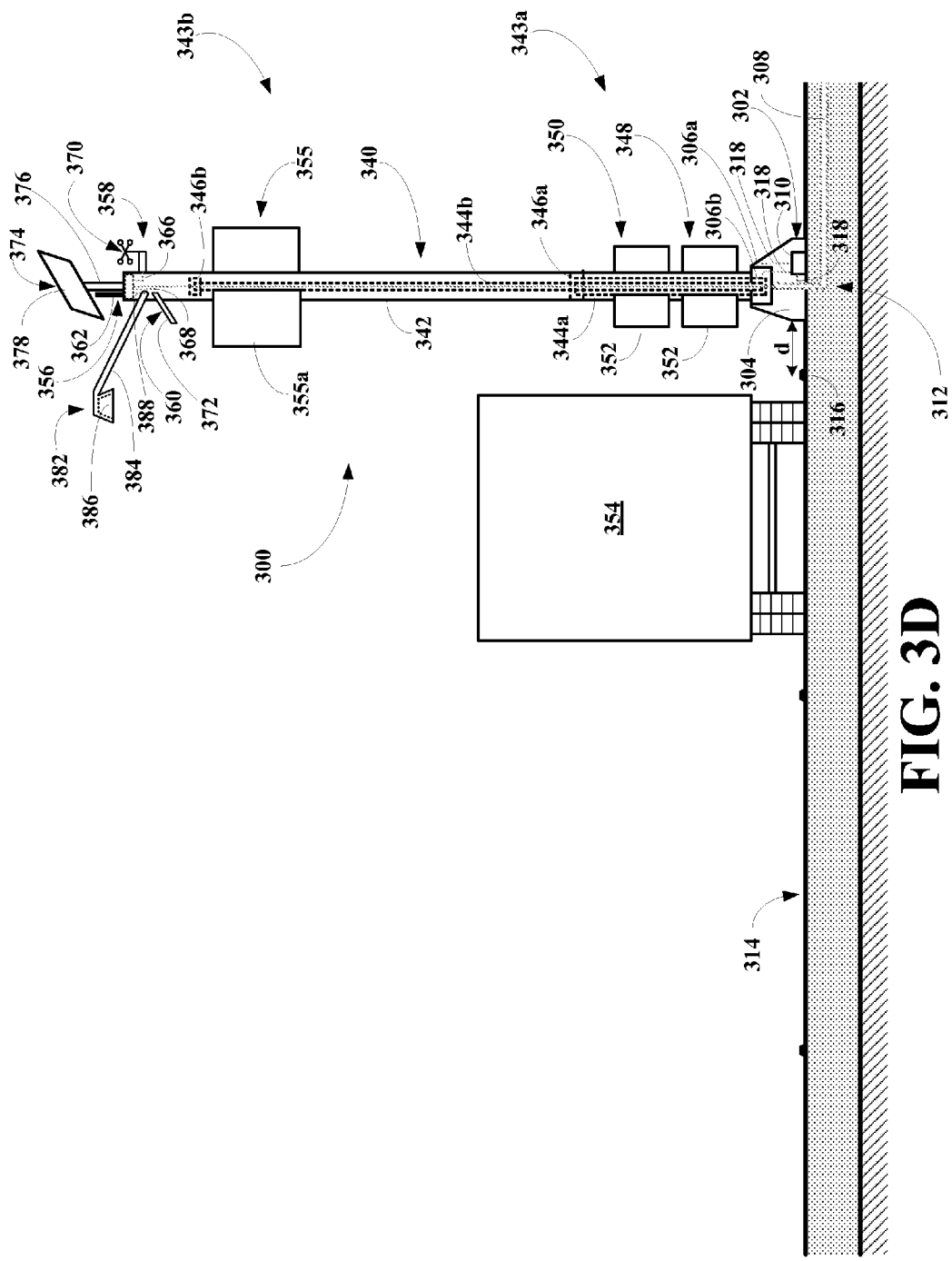
FIG. 3D depicts another embodiment of this invention of an electrical energy generating apparatus utilizing artificial wind and natural occurring wind with a photovoltaic assembly and an illumination assembly.

Referring now to FIG. 3D, an embodiment of an apparatus of this invention, generally 300, is shown to further include the photovoltaic assembly 374, which includes the vertical mount 376 and the solar panel 378 connected via the fourth wire 380 to the conduit 308 and/or storage unit 310, where the fourth wire 380 runs coincident with the wire 364. The apparatus 300 further includes the illumination assembly 382, which includes the angled mount 384 and the light 386 connected via the fifth wire 388 to the assembly 356.

Figure 3E:
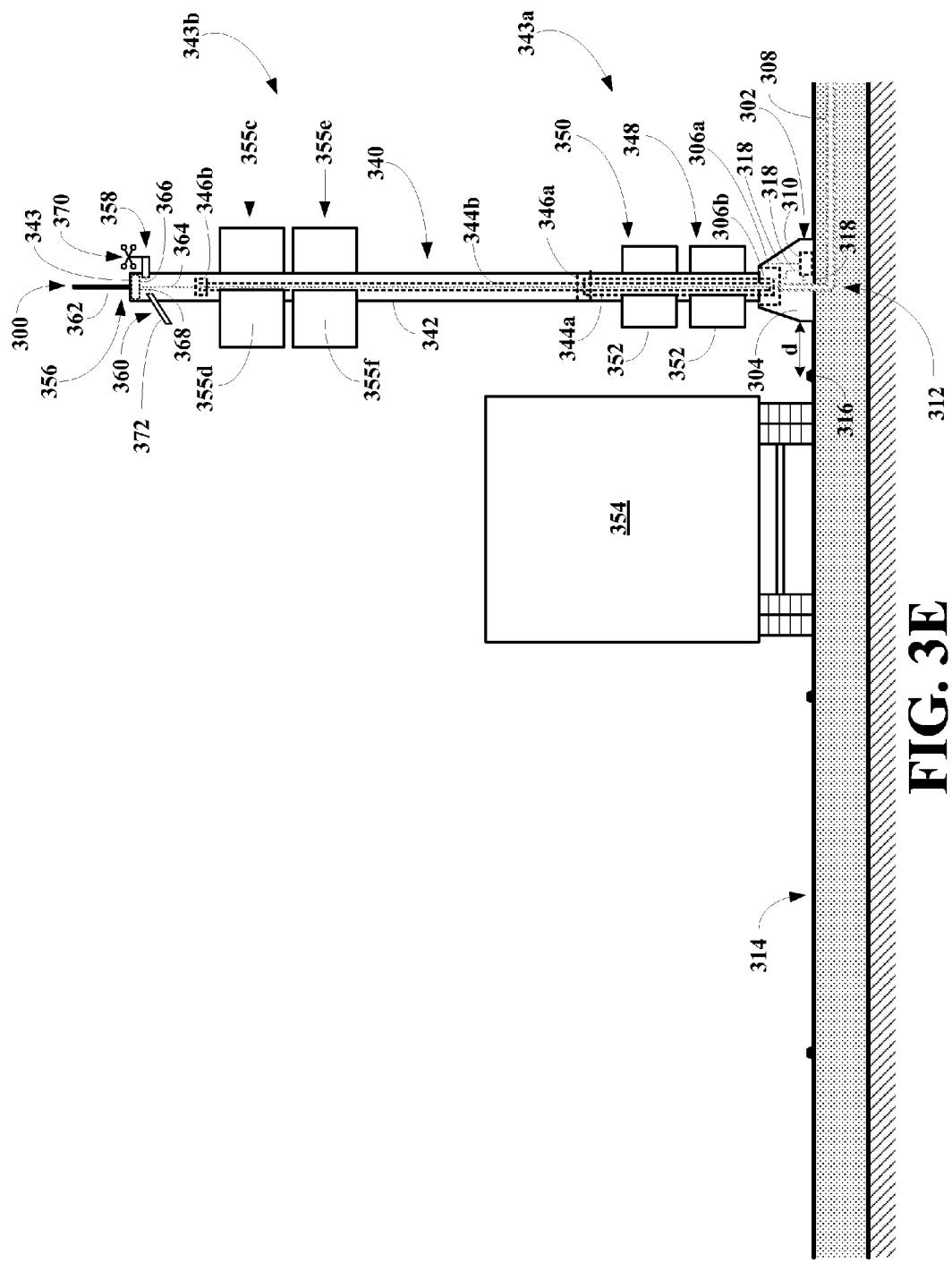
FIG. 3E depicts another embodiment of this invention including two natural wind turbines.

Referring now to FIG. 3E, mounted on the inner shaft 344 b is a first natural wind vertically oriented wind turbine 355c having blades 355d and a second natural wind vertically oriented wind turbines 355e having blades 355f. The natural wind turbines 355c and 355e are located near a top 343c of the vertical housing 342. The natural wind turbines 355c and 355e may be larger than the artificial wind turbines 348 and 350 because there are less space restrictions compared to the artificial wind turbines 348 and 350. In other embodiments, the turbine adapted for capturing the natural ambient wind turbines 355c and 355e can also be a horizontal axis turbine with integral generator. Alternatively, the nature wind turbines 355c and 355e may be a horizontally oriented turbine.

Figure 4:
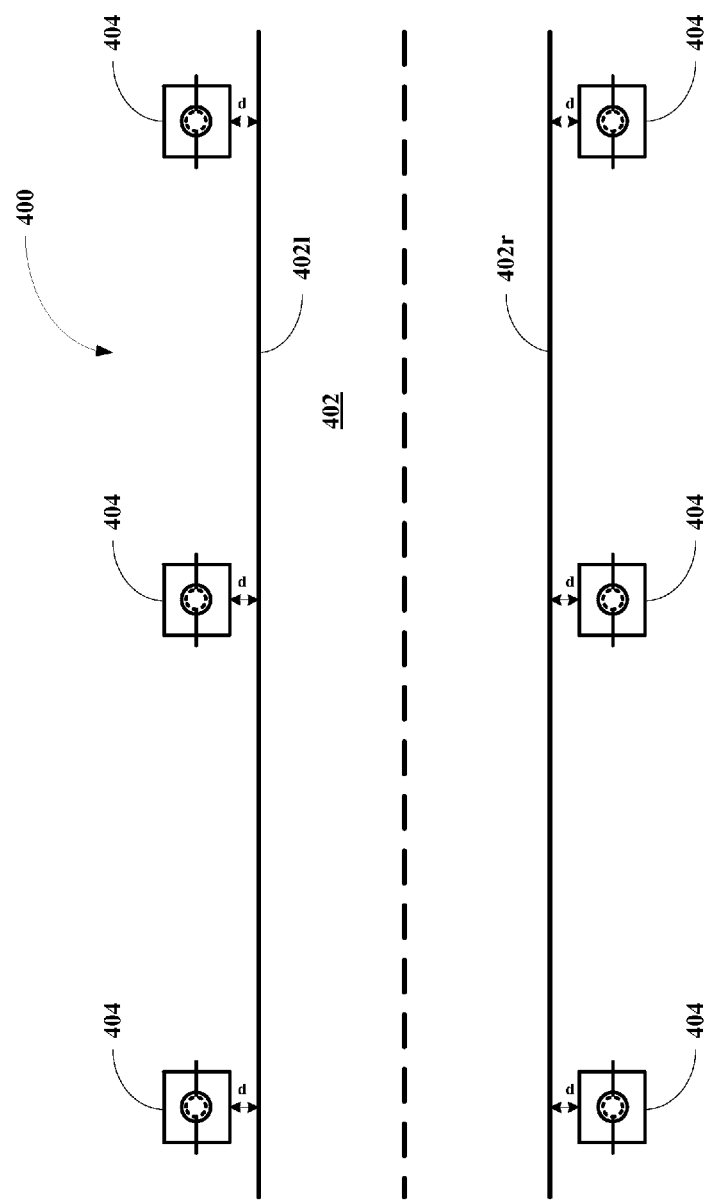
FIG. 4 depicts a roadway with a plurality of the units of this invention disposed along the roadway.

Referring now to FIG. 4, a system 400 of this invention is shown to include a divided roadway 402 having a right side 402r and a left side 402l. In a spaced apart configuration, a plurality of apparatuses 404 of this invention are disposed along the right side 402r and the left side 402l of the roadway 402. The apparatuses 404 may comprises a single type of apparatuses as set forth in FIGS. 2A-D and FIGS. 3A-E.

The present invention of a dual-mode roadway wind turbine system is thus described; it will be obvious that the same may be varied in many ways. Such variations are not to be regarded as departure from the spirit and scope of the present invention, and all such modifications as would be obvious to one skilled in the art are intended to be included within the scope of this disclosure.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. An apparatus for generating electrical energy along a roadway comprising:
   a base unit,
   a first electric generator,
   a vertical unit including:

a first rotatable vertically oriented shaft disposed in the vertical unit, where the first shaft extends from a first bearing assembly at its top end to the electrical generator at its bottom end, where the first shaft turns the first electric generator to generate electrical energy, and a vertical artificial wind turbine mounted on the first shaft in a lower section of the vertical unit and adapted to rotate the first shaft in response to artificial wind generated by a passing vehicle generating electric energy from the first electric generator, and where the base unit is positioned adjacent a right hand, a central median, and/or left hand lane of a roadway so that the artificial wind turbines effectively and efficiently utilize the artificial pulsed wind to generate electric energy using the first electric generator.

2. The apparatus of claims 1, wherein a plurality of vertical artificial wind turbines are mounted on the first shaft and vertically distributed in a spaced apart configuration along the first shaft.

3. The apparatus of claim 1, further comprising:
a second electric generator, and
wherein the vertical unit further includes:
   a second rotatable vertically oriented shaft, where the second shaft surrounds the first shaft and extends from a second bearing assembly in an upper of the vertical unit at its top end to the second electrical generator at its bottom end, where the second shaft turns the second electric generator to generate electrical energy, and
   a natural wind turbine mounted vertically or horizontally on the second shaft in an upper section of the vertical unit and adapted to rotate the second shaft in response to naturally occurring wind generating electric energy from the second electric generator, and
where the naturally occurring wind turbines effectively and efficiently utilize the naturally occurring wind to generate electric energy using the second electric generator.

4. The apparatus of claims 3, wherein a plurality of vertical natural wind turbines are mounted on the second shaft and vertically distributed in a spaced apart configuration along the second shaft.

5. The apparatus of claim 1, wherein the vertical unit further includes:
a photovoltaic assembly adapted to convert sunlight into electric energy.

6. The apparatus of claim 1, wherein the vertical unit further includes:
a roadway illumination assembly.

7. The apparatus of claim 1, wherein the vertical unit further includes:
a wireless communication assembly,
an environmental sensor assembly and/or
a roadway sensor assembly.

8. The apparatus of claims 1, further comprising:
a cable connecting the generator and/or a storage unit to a grid.

9. The apparatus of claims 8, wherein the grid comprises a local electric grid, a regional electric grid and/or a national electric grid.

10. The apparatus of claims 9, wherein the local grid comprises a grid interconnecting a plurality of the apparatuses distributed in a spaced apart configuration along the roadway.

11. The apparatus of claim 1, wherein the apparatus is positioned at a distance d from the lane to maximize artificial wind utilization, where d is a distance where the artificial wind speed is at least 2 m/s.

12. The apparatus of claim 1, wherein the apparatus is positioned at a distance d from the lane to maximize artificial wind utilization, where d is a distance where the artificial wind speed is at least 3 m/s.

13. The apparatus of claim 1, wherein the apparatus is positioned at a distance d from the lane to maximize artificial wind utilization, where d is a distance where the artificial wind speed is at least 4 m/s.

14. The apparatus of claim 1, wherein the base unit is a stand alone structure with a footing support or a part of a traffic barrier.

15. A system comprising:
a plurality of electric generation apparatuses distributed in a spaced apart configuration along a length of a roadway, where each apparatus comprises:
   a base unit,
   a first electric generator, and
   a vertical unit including:
      a first rotatable vertically oriented shaft disposed in the vertical unit, where the first shaft extends from a first bearing assembly at its top end to the first electrical generator at its bottom end, where the first shaft turns the first electric generator to generate electrical energy, and
      a vertical artificial wind turbine mounted on the first shaft in a lower section of the vertical unit and adapted to rotate the first shaft in response to artificial wind generated by a passing vehicle generating electric energy from the first electric generator, and
   where the base unit is positioned adjacent a right hand, a central median, and/or left hand lane of a roadway so that the artificial wind turbines effectively and efficiently utilize the artificial pulsed wind to generate electric energy using the first electric generator.

16. The system of claim 15, further comprising:
a second electric generator, and
wherein the vertical unit further includes:
   a second rotatable vertically oriented shaft, where the second shaft surrounds the first shaft and extends from a second bearing assembly in an upper of the vertical unit at its top end to the second electrical generator at its bottom end, where the second shaft turns the second electric generator to generate electrical energy, and
   a natural wind turbine mounted vertically or horizontally on the second shaft in an upper section of the vertical unit and adapted to rotate the second shaft in response to naturally occurring wind generating electric energy from the second electric generator, and
where the naturally occurring wind turbines effectively and efficiently utilize the naturally occurring wind to generate electric energy using the second electric generator.

17. The system of claim 16, wherein the vertical unit further includes:
a photovoltaic assembly adapted to convert sunlight into electric energy,
a roadway illumination assembly,
a wireless communication assembly,
an environmental sensor assembly and/or
a roadway sensor assembly.

18. The system of claim 17, wherein the base unit further includes:
a cable connecting the generator and/or the storage unit to a grid.

19. The system of claims 18, wherein the grid comprises a local electric grid, a regional electric grid and/or a national electric grid.

20. The system of claims 19, wherein the local grid comprises a grid interconnecting a plurality of the apparatuses distributed in a spaced apart configuration along the roadway.

21. The system of claim 20, wherein the system is a component of an Intelligent Transportation System (ITS).

22. The system of claim 15, wherein the apparatuses are positioned at a distance d from the lane to maximize artificial wind utilization, where d is a distance where the artificial wind speed is at least 2 m/s.

23. The system of claim 15, wherein the apparatus is positioned at a distance d from the lane to maximize artificial wind utilization, where d is a distance where the artificial wind speed is at least 3 m/s.

24. The system of claim 15, wherein the apparatus is positioned at a distance d from the lane to maximize artificial wind utilization, where d is a distance where the artificial wind speed is at least 4 m/s.

25. The system of claim 15, wherein the base units are stand alone structures with footing support or a part of a traffic barrier.

\* \* \* \* \*